United States Patent
Sonehara et al.

(10) Patent No.: US 6,388,697 B1
(45) Date of Patent: May 14, 2002

(54) IMAGE FORMING DEVICE AND TWO DIMENSIONAL OPTICAL SCANNING DEVICE

(75) Inventors: Tomio Sonehara; Hidekazu Kobayashi, both of Suwa (JP)

(73) Assignee: Seiko Epson Corporation, Nagano-ken (JP)

(*) Notice: Subject to any disclaimer, the term of this patent is extended or adjusted under 35 U.S.C. 154(b) by 0 days.

(21) Appl. No.: 08/294,779

(22) Filed: Aug. 23, 1994

Related U.S. Application Data

(63) Continuation of application No. 07/645,070, filed on Jan. 23, 1991, now abandoned.

(30) Foreign Application Priority Data

| Jan. 25, 1990 | (JP) | 2-15304 |
|---|---|---|
| Jan. 25, 1990 | (JP) | 2-15305 |
| Jan. 25, 1990 | (JP) | 2-15306 |
| Jan. 25, 1990 | (JP) | 2-15307 |
| Jan. 25, 1990 | (JP) | 2-15308 |
| Jan. 25, 1990 | (JP) | 2-15309 |
| Jan. 29, 1990 | (JP) | 2-18214 |
| Jan. 29, 1990 | (JP) | 2-18216 |
| Jan. 31, 1990 | (JP) | 2-20615 |
| Feb. 8, 1990 | (JP) | 2-29225 |
| Feb. 19, 1990 | (JP) | 2-29226 |
| Oct. 19, 1990 | (JP) | 2-281532 |

(51) Int. Cl.$^7$ .............. B41J 2/47; C02B 26/08
(52) U.S. Cl. ............ 347/239; 347/255; 359/202
(58) Field of Search .............. 346/107 R; 359/72, 359/71, 45, 56, 100, 201, 202, 203, 212, 214, 223, 48; 347/135, 239, 255

(56) References Cited

U.S. PATENT DOCUMENTS 3,890,035 A    6/1975  Takeda

| 4,351,589 A | * | 9/1982 | Chavel et al. | 349/17 |
|---|---|---|---|---|
| 4,383,261 A | * | 5/1983 | Goldberg | 347/224 |
| 4,445,126 A | * | 4/1984 | Tsukada | 347/242 |
| 4,538,884 A | * | 9/1985 | Masaki | 349/28 |

(List continued on next page.)

FOREIGN PATENT DOCUMENTS

| EP | 0 385 346 | 9/1990 |
|---|---|---|
| JP | 59-216216 | 12/1984 |
| JP | 61-14191 | 6/1986 |
| JP | 63-108323 | 5/1988 |
| JP | 63-175828 | 7/1988 |
| JP | 1-140131 | 1/1989 |
| JP | 64-56410 | 3/1989 |
| JP | 2-916 A | 1/1990 |

OTHER PUBLICATIONS

Multiplexed Phase–Encodrd Lenses Written on Spatial Light Modulators by Jeffrey A. Davis et al., Optics Letters, vol. 14, No. 9, May 1, 1989, pp. 420–422.

(List continued on next page.)

Primary Examiner—David F. Yockey
(74) Attorney, Agent, or Firm—Stroock & Stroock & Lavan LLP

(57) ABSTRACT

An image forming device for forming optically inputted two-dimensional images. A light valve, including a bistable electrooptic medium and a photoconductive material, acts as an image recording device which records an image inputted from an image inputting device. When the light valve is irradiated by the light from the image inputting device, the electrooptic medium makes a state transition by photoelectric converting action of the photoconductive material. The state of the electrooptic medium is dependent on the threshold voltage across the light valve and on the threshold intensity of the input light. The recorded image can be outputted to film or any type of visual display apparatus. The image inputting device can be a modulated scanned light beam, as from a laser.

25 Claims, 11 Drawing Sheets

U.S. PATENT DOCUMENTS

| | | | | |
|---|---|---|---|---|
| 4,692,779 | A | * | 9/1987 | Ando et al. ................. 347/123 |
| 4,695,973 | A | | 9/1987 | Yu |
| 4,707,077 | A | | 11/1987 | Marom |
| 4,717,925 | A | * | 1/1988 | Shibata et al. .............. 347/250 |
| 4,733,307 | A | | 3/1988 | Watanabe .................... 358/285 |
| 4,933,687 | A | * | 6/1990 | Winsor ........................ 347/242 |
| 4,941,735 | A | * | 7/1990 | Moddel et al. ............... 349/29 |

OTHER PUBLICATIONS

Dynamic Optical Interconnections by E. Marom et al., Optics Letters, vol. 12, No. 7, Jul. 1987, pp. 539–541.

Computer–Generated Hologram Using TFT Active Matrix Liquid Crystal Spatial Light Modulator (TFT–LCSLM) by Jun Amako et al., Japanese Journal Of Applied Physics, vol. 29, No. 8, Aug. 1990, pp. L1533–L1535.

Real–Time Computer Generated Hologram By Means of Liquid Crystal Television Spatial Light Modulator by Fai Mok et al., Optics Letters, vol. II, Nov. 1988, pp. 748–750.

Computer–Generated Holographic Component With Optimum Light Efficiency by H. Bartelt, Applied Optics, vol. 23, No. 10, May 15, 1984, pp. 1499–1502.

High Efficiency Optical Reconstruction of Binary Phase–Only Filters Using The Hughes Liquid Crystal Light Valve by Jeffrey A. Davis et al., Applied Optics, vol. 26, No. 5, Mar. 1, 1987, pp. 929–933.

Phase–Only Modulation With Twisted Nematic Liquid–Crystal Spatial Light Modulators by N. Konforti et al., Optics Letters, vol. 13, No. 3, Mar. 1988, pp. 251–253.

Phase–Only Modulation Using a Twisted Nematic Liquid Crystal Television by Thomas H. Barnes et al., Applied Optics, vol. 28, No. 22, Nov. 15, 1989, pp. 4845–4852.

Phase Only Liquid Crystal Light Modulator and Its Application in the Fourier Plane of Optical Correlation Systems by Thomas H. Barnes et al., SPIE vol. 1134 Optical Pattern Recognition II (1989), pp. 204–208.

Dynamic Holographic Interconnects Using Static Holograms by Eric S. Maniloff et al., Optical Engineering, vol. 29, No. 3, Mar. 1990, pp. 225–229.

A Simplification of Lee's Method of Generating Holograms by Computer by C.B. Buckhardt, Applied Optics, vol. 9, No. 8, Aug. 1970, p. 1949.

The Kinoform: A New Wavefront Reconstruction Device by L.B. Lesem et al., IBM J. RES. Develop., 1969, pp. 150–155.

Iterative Method Applied to Image Reconstruction and to Computer–Generated Holograms by J.R. Fienup, Optical Engineering, vol. 19, No. 3, May/Jun. 1980, pp. 297–305.

19.5: Laser–Addressed Liquid–Crystal Light Modulators for Color Electronic Imaging With Mead Microencapsulated Paper by Sun Lu et al., SID 87 Digest, 1987, pp. 367–390.

9.2: A New Color–TV Projector by Alexander D. Jacobson et al., SID 77 Digest, 1977, pp. 106–107.

Application of the Liquid Crystal Light Valve to Real–Time Optical Optical Data Processing by W.P. Bleha et al., Optical Engineering, vol. 17, No. 4, Jul.–Aug. 1978, pp. 371–284.

Photoaddressed Liquid Crystal Spatial Light Modulators by David Armitage et al., Applied Optics, vol. 28, No. 22, Nov. 15, 1989, pp. 4763–4771.

Design and Performance of High–Speed Optically–Addressed Spatial Light Modulators by W. Li et al., SPIE vol. 936 Advances In Optical Information Processing III, 1988, pp. 48–55.

Ferroelectric Liquid Crystal Spatial Light Modulator Using A Hidrogenated Amorphas Silicon Photoconductor by S. Yamamoto et al., Research & Development Department, Seiko Instruments Inc., 563 Takatsukashinden, Matsudoshi, Chiba 271, Japan, p. 59.

7–2 Use of Optimised Chiral Smectic Liquid Crystals in Optical Processing by D. Coates et al., Japan Display, 1989, pp. 176–178.

Thermally Addressed Electrically Erased High–Resolution Liquid–Crystal Light Valves by H. Melchior et al., Bell Telephone Laboratories, Murray Hill, New Jersey 07974, 1972, pp. 392–394.

14.2: A Compact High–Resolution Image Projector and Printer Using A Laser–Addressed Liquid–Crystal Light Valve by K. Kubota et al., SID 85 Digest, 1985, pp. 260–261.

Photo Addressed Liquid Crystal Light Valve For Printing And Imaging by Tomio Sonehara et al., SPIE vol. 1254 Optical Hard Copy And Printing Systems, 1990, pp. 191–201.

Smectic A* Materials with 11.25 Degrees Induced Tilt Angel for Full Grey Scale Generation by D. Coates et al., BDH Limited, Broom Road, Poole, BH12 4NN, England.

Synthesis And Mesomorphic Characteristic of Bicyclo[2,2,2] Octane Derivatives With Smectic C Phase by R. Dabrowski et al., Military Technical Academy, 04–489 Warsaw 49, Poland.

Extension of Effective Aperture and Optical Compensation of Undesired Deflection Component in Light Beam Scanner Using Rotating Polygonal Mirror by Teiichi Taneda et al. (NHK Technical Research Laboratories ) ( including English Abstract).

Fast Photoconductor Coupled Liquid–Crystal Light Valve by L. Samuelson et al., Appl. Phys. Lett., vol. 34, No. 7, Apr. 1, 1979.

Hydrogenated Amorphous–Silicon Photosensor For Optically Addressed High–Speed Spatial Light Modulator, by Wen Li et al., IEEE Transactions on Electron Devices, vol. 36, No. 12, Dec. 1989, pp. 2959–2964.

* cited by examiner

A AND B̄

A EX. OR B

IMAGE FORMING DEVICE AND TWO DIMENSIONAL OPTICAL SCANNING DEVICE

This is a continuation of application Ser. No. 07/645,070, filed Jan. 23, 1991 now abondaned.

BACKGROUND OF THE INVENTION

This invention relates generally to an optical scanning device for effecting two-dimensional scanning of laser beams and an image forming device as well, and more particularly, to a device for forming an optically inputted two-dimensional image and a recording method thereof.

A conventional image forming device is disclosed in Japanese Patent Laid-Open No. 216126/1984 as a device using thermoplastic material as a medium to be modulated. In addition, SID 87 DIGEST p. 367 (1987) and SID 85 DIGEST P. 260 (1985), disclose devices wherein an image stored on a light valve employing a smectic A (hereinafter SmA) liquid crystal is recorded on sensitizing paper or a photosensitive material.

Another prior art device is disclosed in vol. 27, No. 1, p. 20 (1975) of the NHK Technical Institute. This device is a two-dimensional scanning device which requires a multiplicity of highly accurate anamorphic lenses in order to make quick corrections with respect to horizontal deflection and vertical deflection. These corrections are made to correct curvatures of the field and of the image surface inclination of a polygon-mirror. The two-dimensional scanning device, which employs vector scan, is based on a galvano-mirror which requires a special focal point correcting means for correcting the curvature of the field.

A great majority of conventional optical image storing devices utilize thermooptic effects in which the storage of an input image can not be controlled electronically. This presents a problem in that a substantial amount of time is required to form the image. A second problem associated with the prior art devices is that driving can cause deterioration of the electrooptic medium. An additional problem is that there is no simple and highly accurate means for inputting the image.

SUMMARY OF THE INVENTION

Generally speaking in accordance with the present invention, an image forming and two-dimensional optical scanning device is provided.

The optical image storing device and the two-dimensional optical scanning device according to the present invention have the following characteristics.

The light valve (hereinafter PALV) includes an electrooptic medium which makes a state-transition by photoelectric converting action of the photoconductive material.

The electrooptic effect PALV forms the image by use of an electrooptic medium which exhibits a bi-stability. The state of the medium is dependent on a threshold voltage and on a threshold intensity of the input beam.

The electrooptic effect PALV employs a dielectric liquid crystal as the electrooptic medium which exhibits the bi-stability and an oblique vapor deposition film composed of an inorganic oxide formed on a surface contiguous to the liquid crystal of at least one of a pair of substrates which sandwich the liquid crystal.

The electrooptic effect PALV is constructed essentially of a photoconductive material, a read-out beam separating means, an electrooptic medium and an electrode.

The image reading means is an image output optical system which irradiates the photosensitive medium with the PALV image. The PALV image beams have a plurality of different wavelengths or wavelength regions. The spectrum of the image output optical system is different from the spectrum of the write beam of the image inputting means.

The image inputting means of the two-dimensional optical scanning device projectively inputs a two-dimensional optical image in synchronization with the recording electric field applying means. It can projectively input a plurality of two-dimensional optical images in synchronization with one of the positive and negative cycles of the recording electric field applying means. The plurality of two-dimensional optical images can be input time sequentially in synchronization with the recording electric field applying means 0.

The two-dimensional optical scanning device includes light beam generating means, a horizontal deflector for effecting horizontal scanning of light beams, a focusing optical means for spotting the light beams on the scanned plane to form an image and an orthogonal deflection for deflecting the light beams deflected by the horizontal deflector in orthogonal directions.

The two-dimensional scanning device is composed of a rotating polygon-mirror deflector for effecting deflective scanning of light beams from the light beam generating means, a focusing optical system for spotting the light beams on the scanned plane to form an image and a linearly movable mirror. The mirror is linearly movable within a specified plane, for reflecting a traveling direction of the light beams deflected by the rotating polygon-mirror deflector at a given angle. In this device, a scanning length $1p$, a displacement of the linear movable mirror $1s$, an angle ($=\alpha/2$) made by the linearly movable mirror and the specified plane and an angle $\beta$ made by the scanned plane and the specified plane satisfy the following two formulae:

$$1p/\sin\alpha = 1s/\sin\beta$$

$$\alpha + 2\beta = \pi$$

The scanning system synchronizes with a reference signal transmitted from a detecting unit for a horizontal scanning cycle of the horizontal deflector.

In the two-dimensional optical scanning device, a scanning system synchronizes with a reference signal defined as a horizontal synchronous signal transmitted from an image signal source. In addition, the scanning system and the driving signal of the recording electric field applying means synchronize with the reference signal which can be transmitted from a detecting unit for a horizontal scanning cycle of the horizontal deflector or from the image signal source.

A driving signal of the recording electric field applying means of the PALV is an AC signal consisting of an erasing signal, a write driving signal synchronized with an image input and a hold period with a duration of one frame.

The write driving signal has a cycle of one polarity corresponding to the writing process, the cycle synchronizing with an image beam input from the image inputting means. When the write driving signal possesses positive polarity, it synchronizes with a positive image input. When the write driving signal possesses negative polarity, it synchronizes with a negative image input.

The erasing signal assumes a polarity opposite to a polarity corresponding to writing of the write signal during an irradiation of the erasing beam. In addition, the erasing signal has an amplitude sufficient to permit an electrooptic medium to effect a state transition during non-irradiation of the beam.

The electric field applying means is in a high impedance or released state during the hold period. The electrooptic medium transits to or is held in any one of the states selected just prior to the hold period.

The beam intensity of the image inputting means consists of a first intensity level at which the PALV can be transited to a different state with a sole input beam intensity and a second intensity level at which the PALV can not be transited with the sole input beam intensity but can be transited to a different state with an intensity of a sum of a plurality of input beams.

Similarly, the driving signal of the recording electric field applying means of the PALV consists of a first voltage level at which the PALV can be transited to a different state with a sole input beam intensity and a second voltage level at which the PALV can not be transited to a different state with the sole input beam intensity but can be transited with an intensity of a sum of a plurality of input beams.

The image read-out means is an image inputting means to a photosensitive material or in another embodiment, the image read-out means is an image output optical system output to a screen. The image read-out means outputs the same image or a mirror image to the photosensitive medium or screen.

A two-dimensional optical scanning device can include: a light beam generating means a rotating polygon-mirror deflector for effecting deflective scanning of the light beams, a focusing optical means for spotting the light beams on the scanned plane to form an image and a linearly movable mirror which is linearly movable within a specified plane for reflecting a traveling direction of the light beams deflected by the rotating polygon-mirror deflector at a given angle, wherein a scanning length $1p$, a moving quantity $1s$ of the linear movable mirror, an angle ($=\alpha/2$) made by the linear movable mirror and the specified plane and an angle $\beta$ made by the scanned plane and the specified plane satisfy the following two formulae:

$$1p/\sin\alpha = 1s/\sin\beta$$

$$\alpha + 2\beta = \pi$$

The focusing optical system includes an optical system for correcting a degree of parallelism of a rotary axis with each mirror of the polygon-mirror.

Accordingly, it is an object of the present invention to provide an improved image forming and optical scanning device.

Another object of the present invention is to provide an image forming and optical scanning device which irradiates the photoconductive material with an input beam by providing a novel driving method and forms a highly accurate image at a high speed.

A further object of the present invention is to provide the more sophisticated functions of a display and a printer for storing and displaying the scanned images.

A still further object of the present invention is to provide both a two-dimensional optical scanning device for simple and high quality raster scanning and an image forming device using this two-dimensional optical scanning device.

Still other objects and advantages of the invention will in part be obvious and will in part be apparent from the specification.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

This invention is directed generally to an optical scanning device for effecting two-dimensional scanning of laser beams and an image forming device as well, and more particularly, to a device for forming an optically inputted two-dimensional image and a recording method thereof.

First Embodiment

Figure 1:
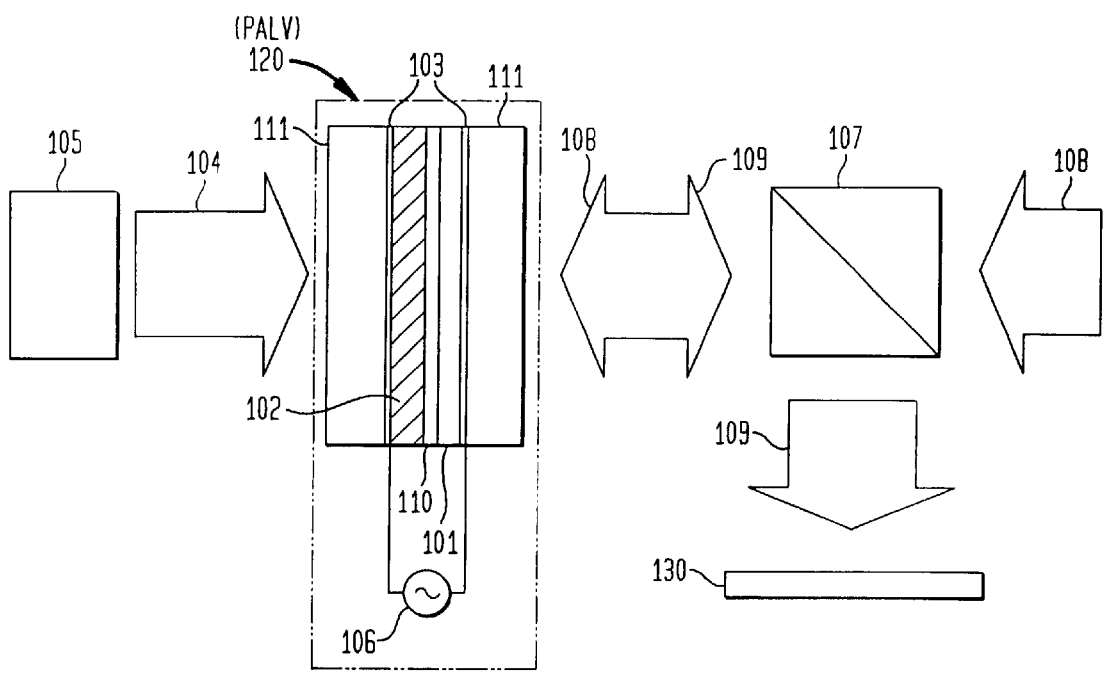
FIG. 1 is a block diagram of an image forming device of the present invention.

FIG. 1 is a block diagram of the image forming device of this invention. The numeral 120 designates an electrooptic effect PALV. A chiral-smectic c liquid crystal 101 (hereinafter referred to as a SmC* liquid crystal) is defined as an electrooptic medium having a two stability states. The bi-stable state of the SmC* liquid crystal 101 is controlled by an electric field applied between electrodes 103 through a photoconductive material 102. The electric field is applied to the transparent electrodes 103 by a recording electric field applying means 106. Image beam 104 is inputted to the photoconductive- material. Polarization beam splitter 107 (hereinafter PBS) constitutes a means for reading a recorded image. PBS 107 allows a read-out beam 108 to pass through to the PALV but directs the image beam 109 towards the photosensitive medium 130. Photosensitive medium 130 is irradiated with image beam 109, thereby effecting a recording process.

In this embodiment, a PALV image is formed on the photo-sensitive medium by use of a projection optical system. A printer and a hard copy device are thus actualized. The photosensitive medium can be the materials disclosed in the article appearing at SID 87 DIGEST p. 367 (1987). Other available materials for this purpose include the mediums and dry silver paper disclosed in the article appearing at SID 85 DIGEST p. 260 (1985). If a screen is disposed in place of the photosensitive medium, a display unit is provided. Indicated at 110 is a read-out beam separating means for preventing the photoconducting material from undergoing an influence from the read-out beam. Also included in the PALV are a pair of transparent substrates 111 which support other components of the PALV. Table 1 details the components of the a image forming device of FIG. 1.

TABLE 1

| | |
|---|---|
| Image inputting means | Image forming projection of image beam or two-dimensional scanning laser beam |
| Recording electric field applying means | Pulse generator |
| Image reading means PALV | He-Ne laser beam, PBS |
| Photoconductive material | High-resistance a-Si containing trace quantity B (by plasma CVD method) |
| Bistable medium | SmC* liquid crystal (CS-1015 made by Chisso Corporation) $SiO_2$ oblique vapor deposition alignment, approximately 2 μm in thickness |
| Electrode | ITO transparent electrode |
| Reading beam | Dielectric mirror |
| Separating means | Multilayer film of Si, $SiO_2$ |
| Substrate | Corning 7059 glass substrate |
| Photosensitive medium | Cycolor ® recording paper (trade mark of Mead Co.) |

The oblique vapor deposition film is used as an alignment film. Liquid crystal molecules are oriented at approximately a 30° incline to the substrate surface. In this embodiment, the film is deposited from a direction tilted at 85° to a normal line of the substrate. As a result, when using liquid crystal molecules having a positive refractive index anisotropy (Δn), apparent Δn×d is reduced (d is the thickness of a liquid crystal layer). For this reason, the thickness d can be increased by optimizing a contrast with an increment of the apparent Δn×d. Namely, the liquid crystal layer can be increased in thickness. Hence, in the case of employing a conventional organic high polymer orientation film, an optimum condition is developed when d=1 μm or thereabouts. Whereas in the present invention, the optimum condition can be found when d=2 μm or thereabouts.

Figure 2:
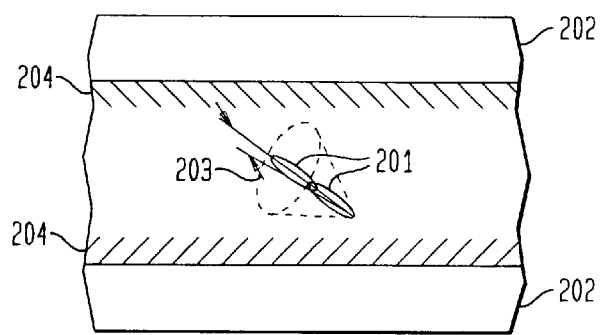
FIG. 2 is a sectional view of a PALV.

FIG. 2 is a view of the PALV wherein the liquid crystal molecules 201 are tilted. Therefore, when the beam is incident on a substrate 202 from a vertical (normal) direction, an apparent director tilt angle θ m (larger than a true tilt angle Θ203) becomes large. This enhances the brightness and contrast as well. A way of combining the two substrates is demonstrated by FIG. 2, wherein deposition films 204 are deposited at oblique angles to define alignments (represented by the angle of the hatching), which are reversely parallel to each other. The deposition of films 204 are not necessarily provided on both substrates. Other materials can be used as the oblique vapor deposition film which exhibit the same function if they are insulating substances which can be deposited.

The response velocity and the alignment property of the liquid crystal layer are controlled while keeping the PALV at a constant temperature in this embodiment.

Figure 3:
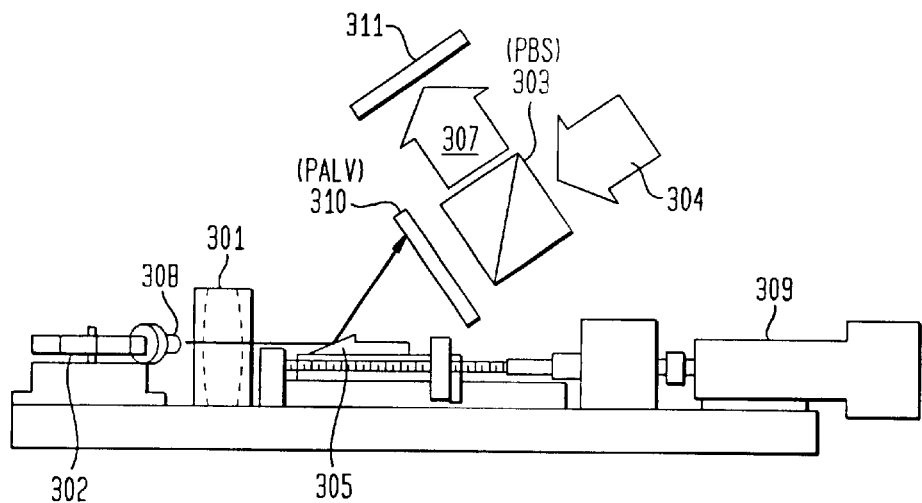
FIG. 3 is a side elevational schematic view of a device for recording an image formed in the PALV on a photosensitive medium by effecting two-dimensional scanning of a leaser beam.

FIG. 3 is a side elevation view of a device for recording an image formed in the PALV on a photosensitive medium. This image is obtained by effecting the two-dimensional scan of a laser beam in directions X-Y and performing image inputting in the PALV. Polygon scanner 302 effects horizontal scanning with a write beam. An X-Y scan is performed on the beam with a linear movable mirror 305 which moves in the direction of the optical axis of a lens 301 within the horizontal polarization plane. The means for moving the linear movable mirror in this embodiment involves the use of a servo motor 309 including a highly accurate cross roller table and a ball screw joined thereto. The output of an encoder serves as a position detecting means for positioning servo motor 309. Moving methods other than the method shown in this embodiment are, as a matter of: course, adoptable on condition that these methods are controllable.

A semiconductor laser (referred to as LD) 308 generates the write beam. Condensing lens group 301 is included for correcting image surface inclination and condensing the beams. Also included in this embodiment is PALV 310 disposed on a plane to be scanned; a polarization beam splitter (PBS) 303 for separating the read-out beam from the image beam; and a read-out beam 304. Scanning beams are spotted on PALV 310, thereby forming pixels: according to the scanning beams. PALV 310 is irradiated by read-out beam 304. The beam is then reflected as image beam 307 to photo-sensitive medium 311 by PBS 303. The PALV image is transcribed on the screen or the photosensitive medium 311.

Figure 4:
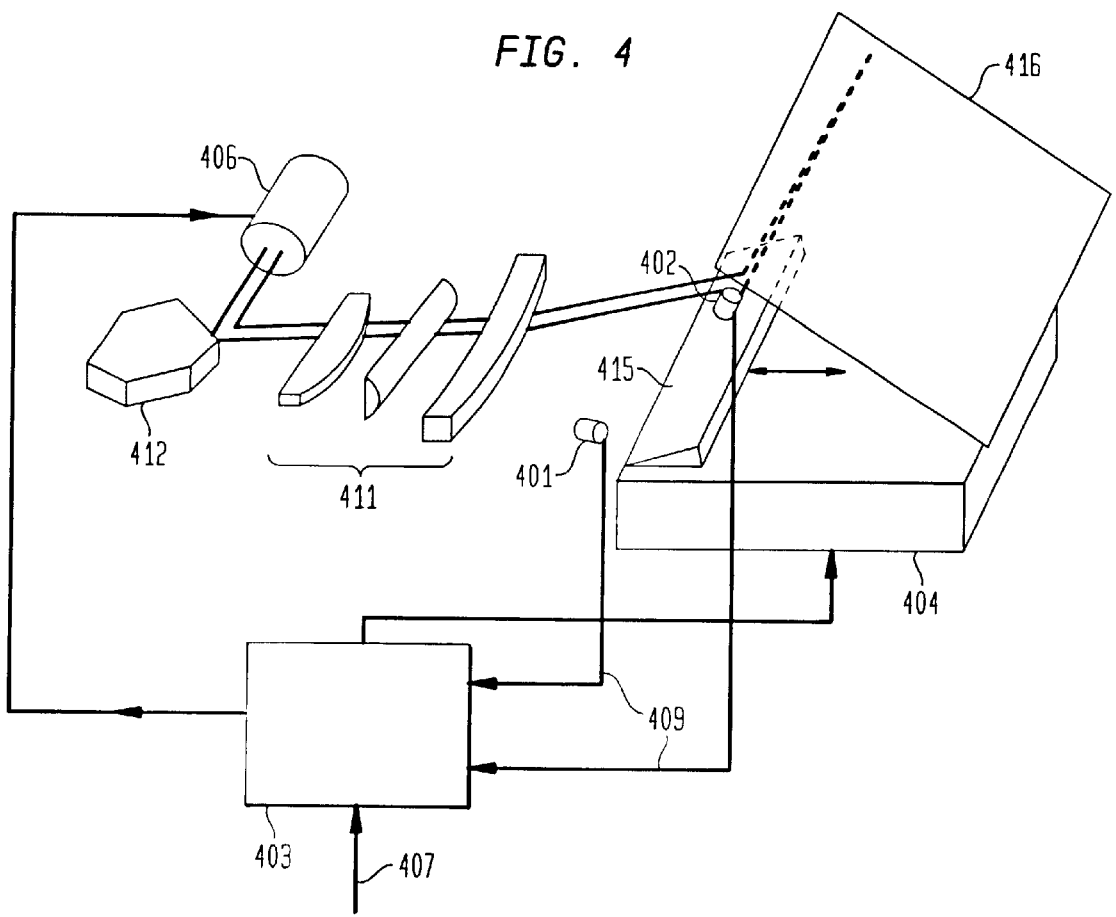
FIG. 4 is a perspective schematic view and block diagram of a two-dimensional optical scanning device of this invention, including a control system.

FIG. 4 is a perspective view of the two-dimensional optical scanner of this invention, including a control system. A synchronous detector 402 for vertical scanning; a photodetector for synchronously detecting horizontal scanning 401 and a control circuit 403 are included. A vertical initial node is detected by a mechanical position detecting method or a photodetecting method which utilizes the leakage of the scanning beam. Scanning signals are transmitted to a linear movable mirror driving unit 404 in synchronization with two synchronous signals 409 from detectors 401 and 402. Image data 407 is transferred to a light beam modulation means 406. Synchronous signals 409, PALV driving signal and reference signals are synchronized as more particularly discussed below. The PALV is disposed on the plane 416 to be scanned by the beam from moving mirror 415, and the scanning beams are spotted on the PALV. As a result, the pixels according to the scanning beams are formed. This figure illustrates a pre-objective scanning optical system in which a rotating polygon-mirror deflector 412 is positioned on the side of a light source with respect to the condensing lens group 411.

Light beams emitted from light beam generating means 406 are polarized by rotating polygon-mirror deflector 412 in the horizontal direction. Next, the polarized beams pass through the lens group 411 for condensing the beams and correcting image surface inclination. The beams are then incident on the linear movable mirror 415. The direction of the beam is changed by the linear movable mirror, and the beam is spotted on the scanned plane 416.

Figure 5:
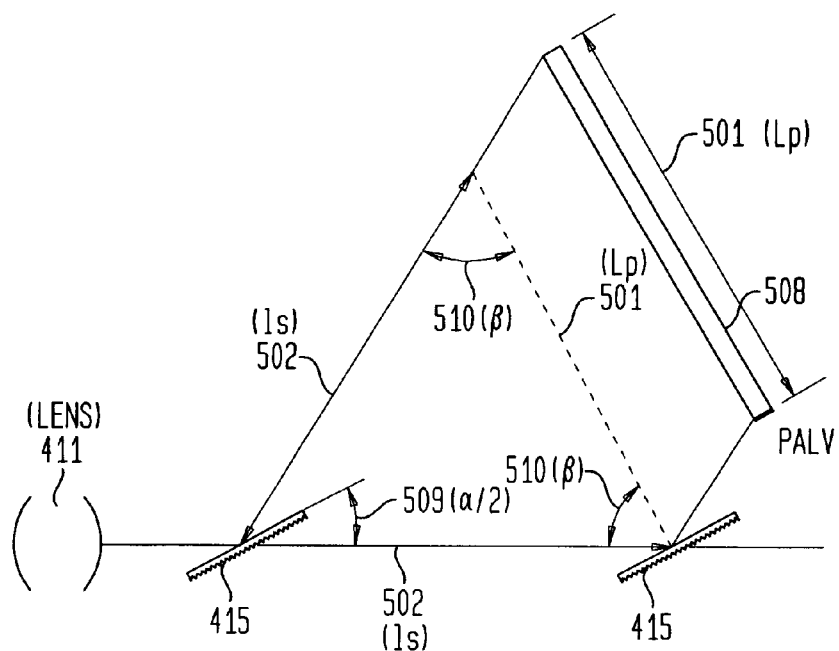
FIG. 5 is a diagram showing the geometric relation of the scanning beams.

FIG. 5 is a diagram showing the geometrical relationship of the scanning beams. A tilt angle ($\alpha/2$) 509 of linear movable mirror 415 and a tilt angle ($\beta$)510 of the scanned plane are set as shown in the formulae (1) and (2) so as not to change the length of a light path with respect to a scanning plane 508 irrespective of the position of mirror 415.

$$1p/\sin\alpha = 1s/\sin\beta \tag{1}$$

$$\alpha + 2\beta = \pi \tag{2}$$

where $1p$ 501 is the effective scanning length, and $1s$ 502 is the distance the linear movable mirror has moved. Table 2 shows the main components in greater detail.

TABLE 2

| Name of components | Specifications |
| --- | --- |
| Rotating polygon-mirror | 6 surfaces    6000 rpm |
| Lens group | one group    3 lenses |
| | positive lens (details are shown in Table 3) |
| | cylindrical lens (the same as above) |
| | negative lens (the same as above) |
| Linear movable mirror | tilt angle ($\alpha/2$) = 30° |
| | stroke 30 mm |
| | increment reflection type surface mirror |
| Scanned plane | tilt angle $\beta$ = 60° |

Table 3 shows an example of manufacturing numerical values the condensing lens group.

TABLE 3

| Surface No. | Curvature Rm | Curvature Rs | Inter-face distance | Reflective index |
| --- | --- | --- | --- | --- |
| 1 | — | — | 45 | 1 |
| 2 | 150 | 150 | 10 | 1.511 |
| 3 | −45.71 | −45.71 | 0 | 1 |
| 4 | ∞ | ∞ | 2 | 1.511 |
| 5 | ∞ | −27.23 | 10 | 1 |
| 6 | −41.15 | −41.15 | 2 | 1.767 |
| 7 | −100 | −100 | 229 | 1 |

Notes:

units=mm

Initial image forming distance Sm=−587

Rm and Rs are radii of curvatures of a meridional plane and a sagittal plane

The first surface is a reflection surface of the rotating polygon-mirror

The horizontal scanning optical system in this embodiment is not limited to this scanning system but may include typical scanning systems. Examples of usable optical systems are disclosed in Japanese Patent Laid-Open No. 13461/1984 and "Optics" Vol 10 (1981), the 5th issue, p. 348. Referring again to FIG. 4, this scanning optical system is capable of correcting the image surface inclination of rotating polygon-mirror 412. It is therefore possible to restrain vertical deflections of the horizontal scanning beams to a smaller degree. Intervals between the horizontal scanning beams undergo almost no influence by angular deflections of linear movable mirror 415 by use of a slider having a high accuracy and the above-mentioned cross roller table as well. This embodiment makes the most of characteristics of the optical system for correcting the image surface inclination. Hence, this embodiment exhibits an advantage of obtaining a hyperfine raster image. This type of laser scanning system similarly functions by employing not only the PALV of this invention but also a PALV using a smectic A liquid crystal as disclosed in an article at Appl. Phys. Lett., vol. 21, p. 392 (1971) and a PALV using a nematic liquid crystal as disclosed in an article at SID 77 digest, p. 106 (1977).

Figure 6:
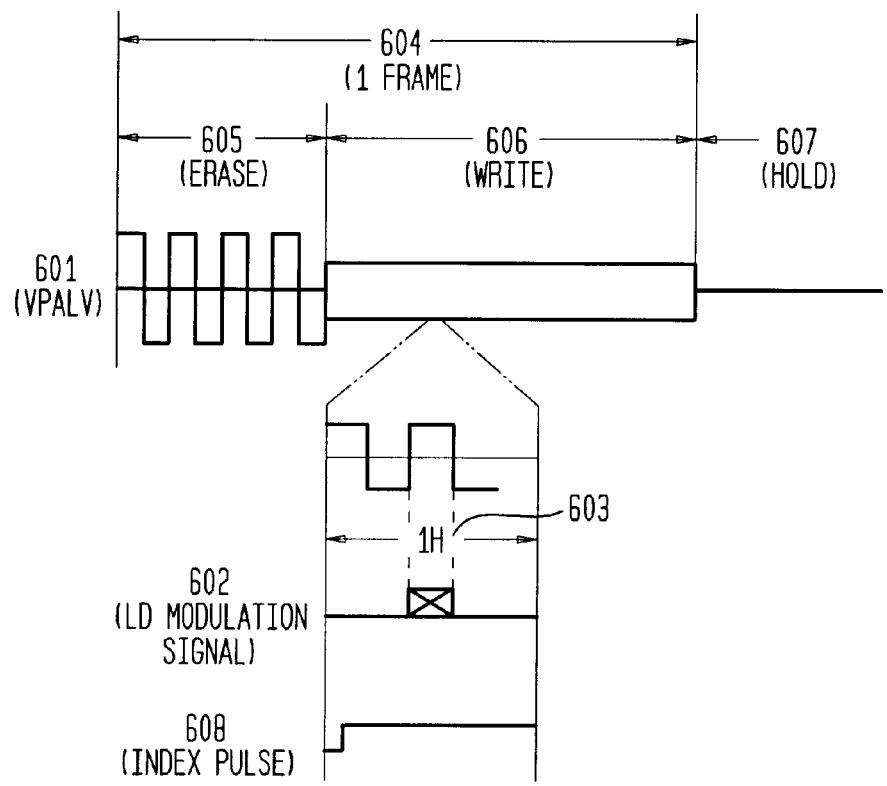
FIGS. 6, 7, 8(a), 8(b) and 8(c) are waveform diagrams each showing an example of a driving signal waveform for the PALV.

In this embodiment, an AC electric field synchronizing with screen scanning is employed as a recording electric field. The image beams are input in synchronization therewith. FIG. 6 is a diagram illustrating a typical driving signal waveform. Signal $V_{PALV}$ 601 represents a driving voltage impressed on the PALV, and signal $LD_{SIGNAL}$ 602 a light emitting signal of a semiconductor laser. Signal $V_{PALV}$ 601 is an AC signal synchronizing with a scanning cycle (1H) 603 of a polygon-scanner. One frame 604 contains an erasing signal 605 and a write driving signal 606. No signal is applied during a hold period 607. An index signal 608 is in sync during scanning cycle (1H) 603. Table 4 shows specifications of the signal and scanner.

TABLE 4

| Polygon scanner | |
| --- | --- |
| Number of revolutions | 6000 rpm |
| Number of surfaces | 6 surfaces |
| Scanning cycle | 1.67 msec |
| $V_{PALV}$ | |
| Erasion | |
| Level | 20 v to −20 v |
| Frequency | 1.2 kHz |
| Application pulse number | corresponding to 4 cycles |
| Write | |
| Level | 10 v to −10 v |
| Cycle (frequency) | 0.167 msec (6 kHz) |
| Duty | 50% |
| Hold | |
| Level | 0 v or release |
| $LD_{SIGNAL}$ | |
| Modulation frequency | 4 MHz |
| Active period | 1.67/20 msec |

Referring to Table 4, the cycle of $V_{PALV}$ 601 is set at 6 kHz, while the duty is set to 50%. Requirements of adoptable duties and frequencies are such that a synchronous relationship between the polygon scanner and the scanning cycle is established, and a write region of the PALV can be effectively horizontally scanned.

Figure 7A:
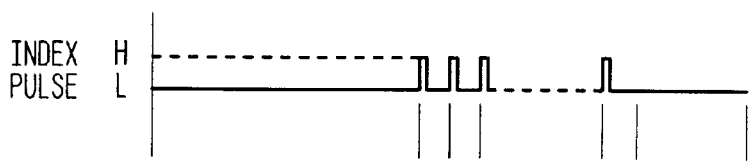
Figure 7B:
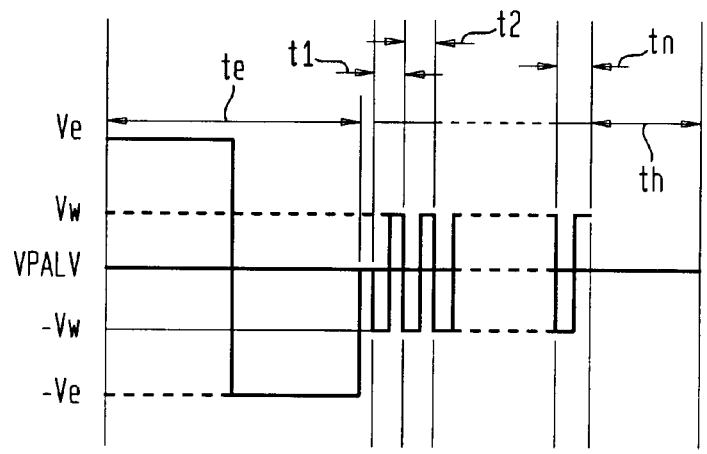
Figure 7C:
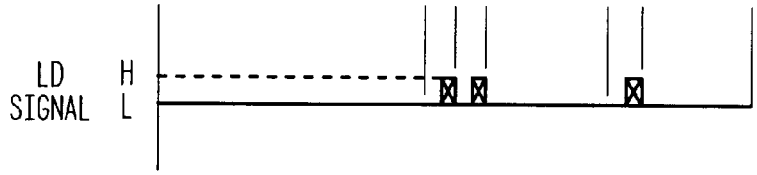

For example, as illustrated in FIG. 7a, the erasing pulses are set corresponding to one cycle, while the active period of $LD_{SIGNAL}$ can be allocated to all the negative cycles of $V_{PALV}$. A series of fundamental write processes will be explained.

The erasing signal is inputted during an erasing period to erase the screen. The amplitude of the erasing pulse, $V_e$ is set to a value such that spontaneous polarization of liquid molecules occurs regardless of the state of the laser beam. An AC recording electric field of amplitude Vw (Vw is set to a value such that the liquid crystal molecules are inverted when photo-pulses are applied) is applied for the next write periods $t_1$–$t_n$. During a period for which the recording electric field assumes a positive polarity, the writing cycle, photo signals modulated corresponding to the image, are inputted to record the image. More specifically, when $LD_{SIGNAL}$ is present during a positive cycle of $V_{PALV}$, the SmC* liquid crystal can be transited from an $S_1$ state corresponding to a negative cycle to an $S_2$ state corresponding to the positive cycle. An applied voltage is set at 0V after the write period (period $t_h$) is terminated.

Figure 8A:
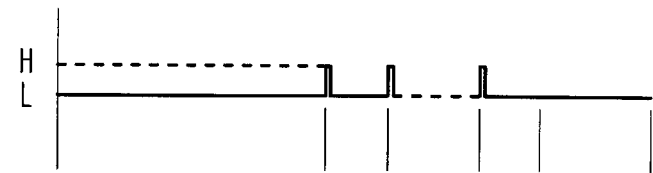
Figure 8B:
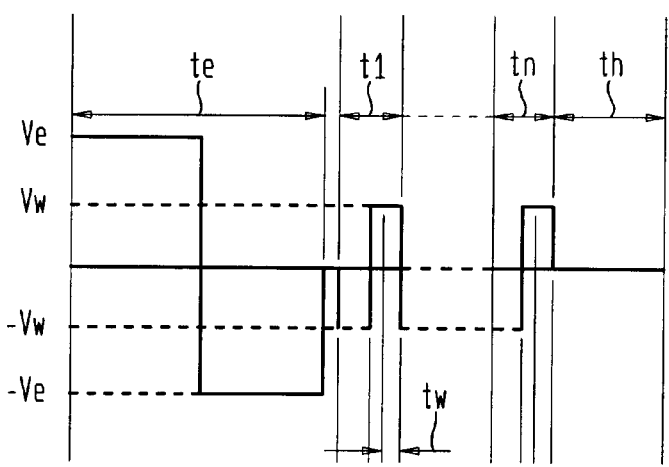
Figure 8C:
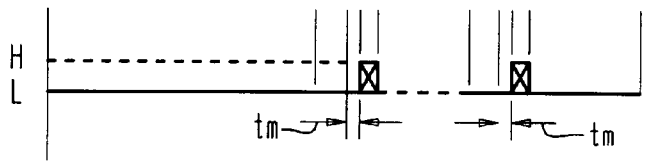

As shown in FIGS. 8(a) through 8(c), before and after a write time Tw for writing one scanning line, the recording electric field is changed to an AC electric field during an "invalid" period. This period is referred to as $T_m$. This period is necessary in order to maintain AC driving and to preclude the possibility of the photo signal LD, from being read before $V_{palv}$ has reached its crest writing value $V_w$. Reference is now had to FIG. 8, a finite period (period tm) is provided as a reactive period till the photo signals are inputted after the liquid crystal layer has achieved positive polarity. After $V_{PALV}$ has assumed the positive polarity on the recording side, the photo signals $LD_{SIGNAL}$, are inputted, thereby recording the image.

Once the write process is concluded, a holding state is effected. In order to stabilize the state of the liquid crystal in a holding state, the electrodes can be opened or, alternatively, a high impedance state can be applied after completing the write scanning on the entire screen. At this time, a high impedance state condition is generated between the electrodes while keeping the recording electric field at Vw. The purpose of the holding state is to prevent a state transition which can be caused by applying transient pulses associated with potential variations of $V_{PALV}$ to the liquid crystal layer. The display on the liquid crystal is arranged in one state to provide the high impedance. In this case, it is possible to prevent a so-called afterimage i.e., the unevenness in display which appears on the screen when writing the next representation.

Note that for erasing, a method is provided which inputs the write beams when the polarity of the liquid crystal layer is opposite to the polarity during the write period, negative polarity in the present example. In this case, the erasing voltage can be reduced.

In addition, partial erasing and partial writing can be performed using this erasing method. The partial erasing can be executed by writing pixels to the cycle having a polarity opposite to that of the write cycle in the sequence of writing the erasing beams. The partial writing is carried out by imparting the write beams to the write cycle subsequent to the partial erasing. The advantage to this method is that the partial erasing/writing process reduces the rewrite time when compared with the entire erasing and rewriting processes.

Figure 9A:
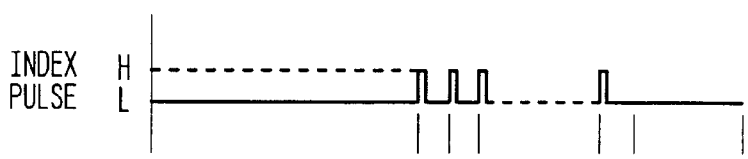
FIGS. 9(a) through 9(c) are waveform diagrams each illustrating a driving waveform in a recording device wherein an erasing method is utilized.
Figure 9B:
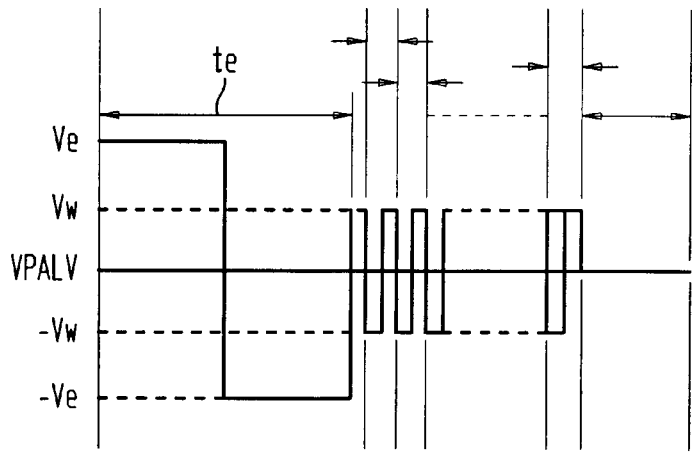
Figure 9C:
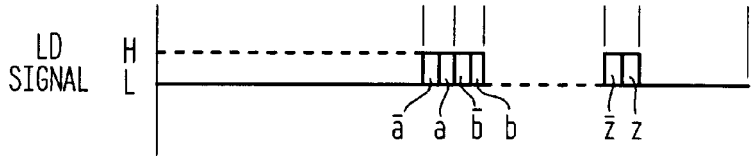

FIG. 9 shows a recording method based on the erasing method described above. The whole screen can be erased by the above-mentioned method. A recording electric field waveform shown in FIG. 9(b) is applied between the electrodes in synchronization with an index signal (see FIG. 9(a)) coincident with laser scanning. An AC recording electric field with maximum value $V_w$ ($V_w$ is a voltage such that the liquid crystal molecules when applying the photo pulses are inverted) is applied across the PALV for the write periods t1 through tn. One line is recorded on the PALV during a single write period.

The operation will be explained in connection with one recording period $t_1$. During recording period $t_1$, $V_{PALV}$ consists of negative and positive pulses. When $V_{PALV}$ is a negative polarity a photo signal (data a of FIG. 9(c)) is applied, which is modulated to correspond to the negative of the image. The image equivalent to half of one scanning is recorded (one half of the image). Next, when the recording electric field $V_{PALV}$ assumes positive polarity, during the period $t_1$, a photo signal (data a of FIG. 9(c)) modulated corresponding to a positive of the image is inputted. The remaining half of the image is recorded. Thereafter, the next line is scanned by the laser beam. Recording is performed during the recording periods t2 through tn in the same manner. According to this method, the same scanning line is divided into several sub-lines, whereby a transition from the $S_1$ state corresponding to the negative cycle to the $S_2$ state corresponding to the positive cycle alternately corresponds to another transition from the $S_2$ state to the $S_1$ state. These two transitions can be allocated for every scanning line at this time, it is required that the negative and positive of the signal $V_{PALV}$ be changed over at least once per scanning line. This method yields an advantage in which the entire scanning time is utilized, not only the time when the liquid crystal is positively polarized.

Figure 10:
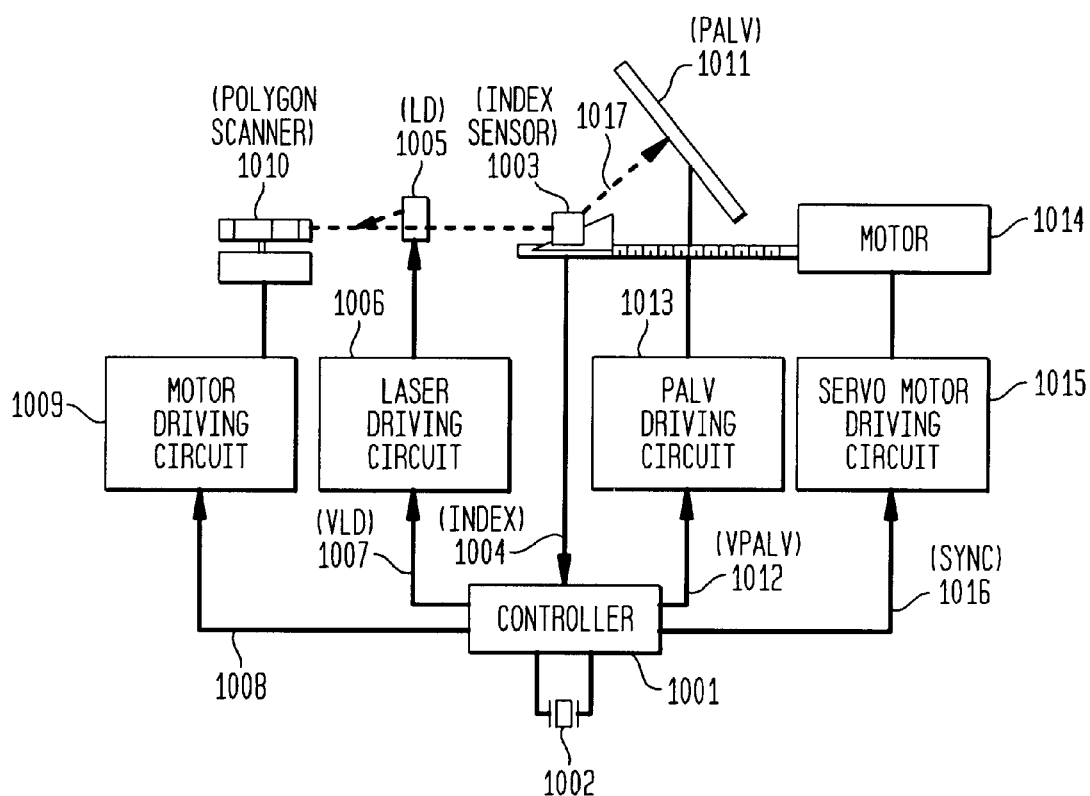
FIG. 10 is a block diagram of a control system of the two-dimensional optical scanning device.

A system for synchronizing a driving signal with a two-dimensional scanning device will be described. FIG. 10 is a block diagram depicting a control system of the two-dimensional scanning device according to the present invention. As discussed above, a control system such as that of FIG. 10 is needed for performing accurate raster scanning, light beam deflections and configurational operation. A controller 1001 which includes a frame memory has an oscillator 1002 for emitting clock signals to control the system. A PLL reference signal within controller 1001 is generated by a horizontal scan detecting signal 1004. Horizontal scan detecting signal 1004 is transmitted from an index sensor 1003. This signal detects the horizontal scanning cycle. A system clock in sync with horizontal scanning is generated by the oscillator clock. A PLL circuit within controller 1001 is composed of a typical comparator, a low-pass filter and a frequency divider. The number of revolutions of the rotating polygon-mirror is applied to the comparator of the PLL circuit after detecting a counter-electromotive force of a brushless motor. Image information to be Rewritten can be accumulated in the frame memory at any time. A serial data signal 1007 in sync with the system clock serves to modulate a semiconductor laser (LD) 1005 which is driven by driving circuit 1006. A rotation control signal 1008 of the rotating polygon-mirror 1010 is outputted from controller 1001 to form the loop of the PLL. Rotating polygon-mirror motor 1010 is driven by driving circuit 1009. In addition, a driving signal 1012 in sync with horizontal scanning is transmitted from controller 1001 to the PALV driving circuit 1013. A frame synchronous signal 1016 is inputted to the driving circuit 1015 of the servo motor 1014 for effecting Y-scanning in accordance with the frame. Y-scanning is kept in synchronous relationship by controller 1001. Note that broken line 1017 indicates a laser beam. A two-dimensional image is formed by this control system.

Figure 11:
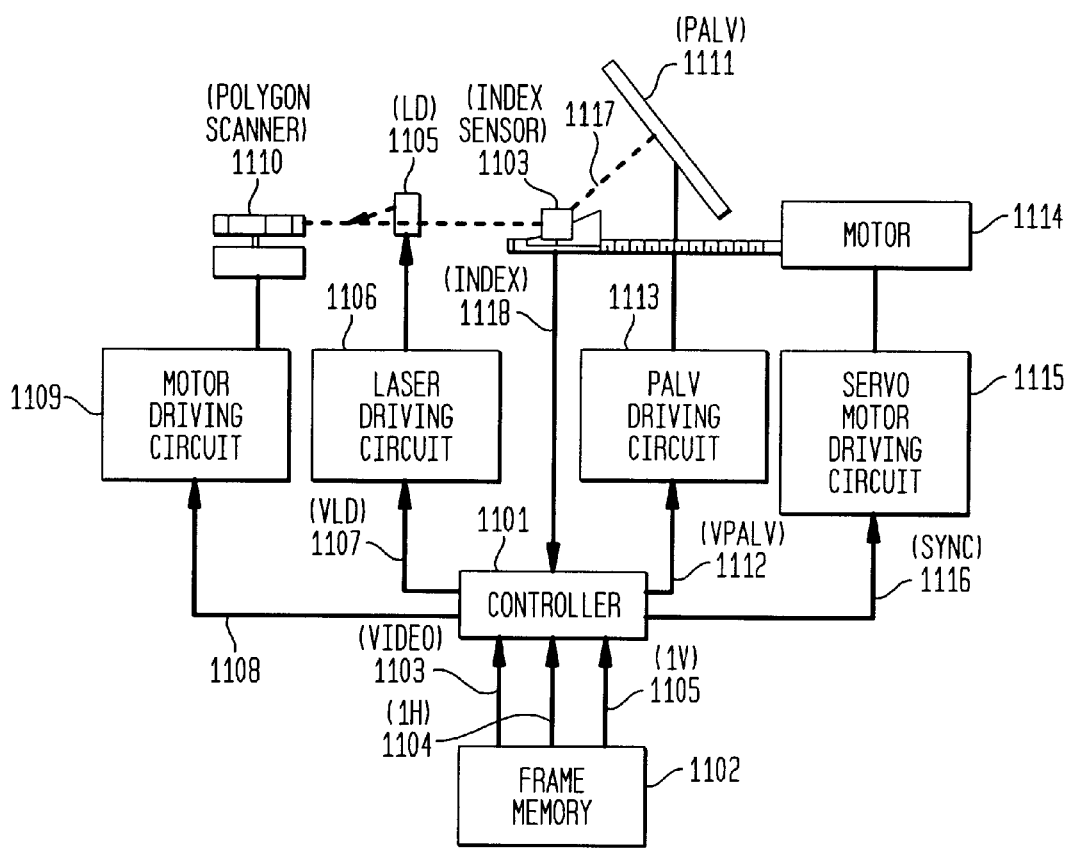
FIG. 11 is a block diagram of a system for handling a video signal.

FIG. 11 is a block diagram of the system depicted in FIG. 10 with the addition of video signals. A frame memory 1102 transmits a video signal 1103, a horizontal synchronous signal 1104 and a vertical synchronous signal 1105. A horizontal scan detecting signal 1118 is sent to the controller 1101 by index sensor 1103. Horizontal scan detecting signal 1118 acts as a revolution counter signal of the rotating polygon-mirror 1110. Horizontal scan detecting signal 1118 is compared with horizontal synchronous signal 1104 corresponding to a PLL reference signal, thereby controlling a driving signal 1108 of the rotating polygon-mirror.

The horizontal scan is thus effected by use of the laser beam completely synchronizing with the horizontal synchronous signal. Video signal 1103 undergoes a level conversion into a serial signal in order to modulate the semiconductor laser 1005 which is driven by laser driving circuit 1106. Driving signal 1108 of rotating polygon-mirror 1110 is outputted from controller 1101 to form a PLL loop. Motor driving circuit 1109 drives rotating polygon-mirror 1110. A PALV driving signal 1112 in sync with horizontal synchronous signal 1104 is inputted from controller 1101 to PALV driving circuit 1113 to drive PALV 1111. A frame synchronous signal 1116 is inputted to a driving circuit 1115 of a servo motor 1114 for performing Y-scanning in accordance with a frame. The Y-scan is kept in synchronous relationship by controller 1101. Frame synchronous signal 1116 is created from the vertical synchronous signal 1105. Laser beam 1117 reflects off mirror 1110 and strikes PALV 1111. A two-dimensional image is formed by the aforementioned control system.

Second Embodiment

Figure 12:
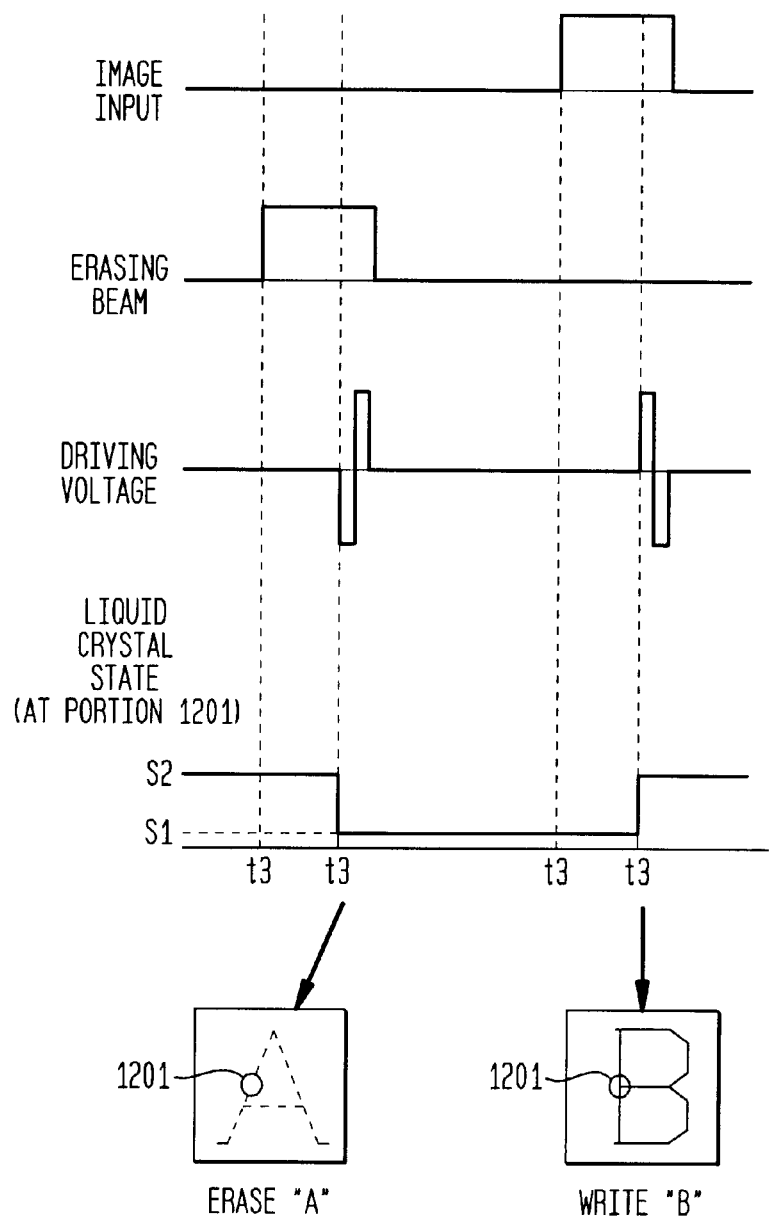
FIG. 12 is a waveform diagram showing a sequence when recording an image.

The second embodiment will deal with an arrangement in which a two-dimensional optical image recording is effected on the PALV, and then employed by an image forming device. The PALV has the composition as shown in the Table 1 in the first embodiment. The image forming device is comprised of the PALV, a means for reading the image and an image inputting means such as an ordinary image forming optical system. The image forming optical system and photosensitive medium discussed in the first embodiment can be utilized. FIG. 12 is a waveform diagram showing the time sequence when recording the image. FIG. 12 shows an image input, an erasing beam input, a driving voltage and the status of a recording device sequentially from above. The entire photoconductive material is irradiated with the erasing beam to initialize the recording device.

Figure 13:
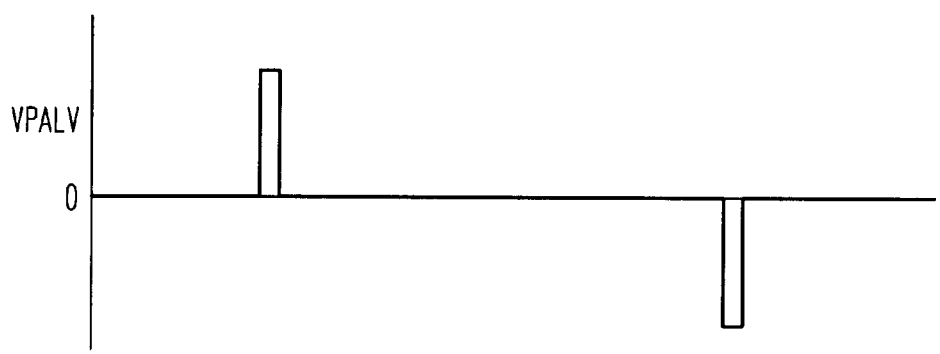
FIG. 13 is a waveform diagram of a driving waveform of a positive pulse alone and of a negative pulse alone.

A series of recording operations will be described. Referring specifically to FIG. 12, $t_1$ indicates the time in which: the state of the liquid crystal layer changes. The erasing beam is emitted at a time $t_0$. A pulse voltage is supplied at a time $t_1$, whereby stable state $S_1$ of the SmC liquid crystal is realized. A letter "A", which has been written, is now erased. The $S_1$ state is thereafter maintained until the recording process is re-initiated. An input image beam is applied to the liquid crystal at time $t_2$. A driving voltage pulse possessing a phase opposite to that at $t_1$ is applied at time $t_3$. At $t_3$, the SmC* liquid crystal of a beam-irradiated portion of the input image B transits to stable state $S_2$ which exhibits a polarity opposite that of $S_1$. So far as the input beam and the driving voltage are not applied thereafter, this image recording status is held. A static driving waveform of the typical SmC* liquid crystal herein serves as a write pulse. However, any pulse capable of switching the bi-stable state may be utilized. For example, the operation can be accomplished by using solely positive pulses or negative pulses, as opposed to the AC waveform of the present embodiment. An example of this is given in FIG. 13.

In addition, the partial erasing and writing processes described above can be performed. The portion of the liquid crystal layer to be erased is irradiated with the erasing beam. The driving voltage pulse for selecting the $S_1$ state is applied. The previous recording status is held in other portions of the liquid crystal layer since no erasing beam is applied. After completing the partial erasing process, partial writing can be performed by applying the driving voltage pulse to select the $S_2$ state and generating a writing image input beam.

The processes described above are modeled after an electronic circuit, namely a flip-flop. The two-dimensional image information is the input signal, and the recording electric field signal is the clock and reset signal.

Figure 14:
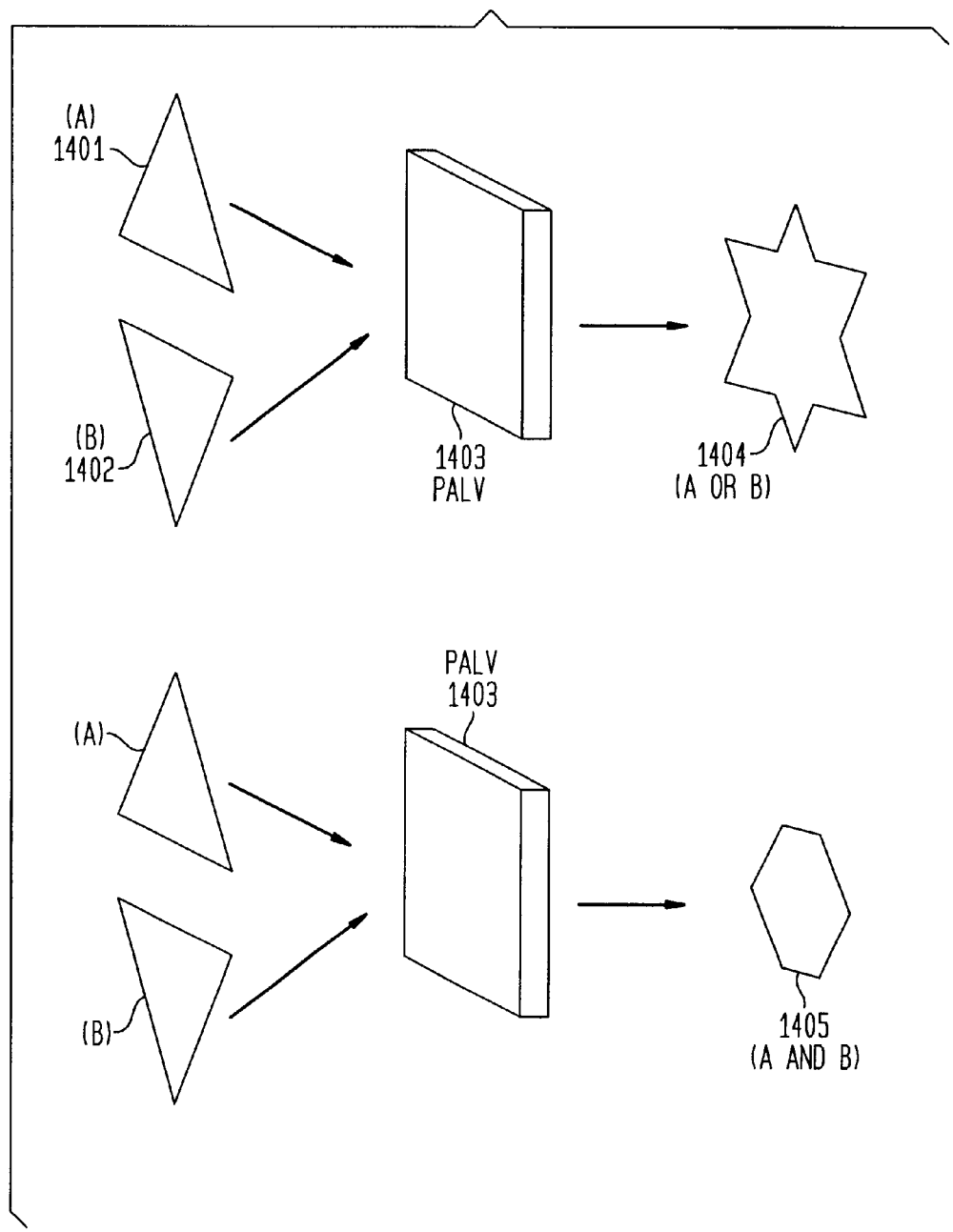
FIG. 14 is a schematic diagram showing a logic operation of a two-dimensional image.

Referring specifically to FIG. 14, a multiplicity of image inputs are simultaneously applied, and the recording electric field signals are applied. At this time, it is possible to effect a logic operation of the two-dimensional image with respect to each image input. FIG. 14 shows an example of two input images, i.e., "A"1401 and "B"1402. For inputting and outputting the images to a PALV 1403, though not illustrated for simplicity in FIG. 14, the image forming optical system previously disclosed may be utilized. The output image 1404 is the result of a logic "or" operation (A+B). Output image 1404 is written to all regions receiving either optical input. The output image 1405 is the output of an "and" logic operation (A.B). Output image 1405 is written to all regions receiving both optical inputs.

Figure 16:
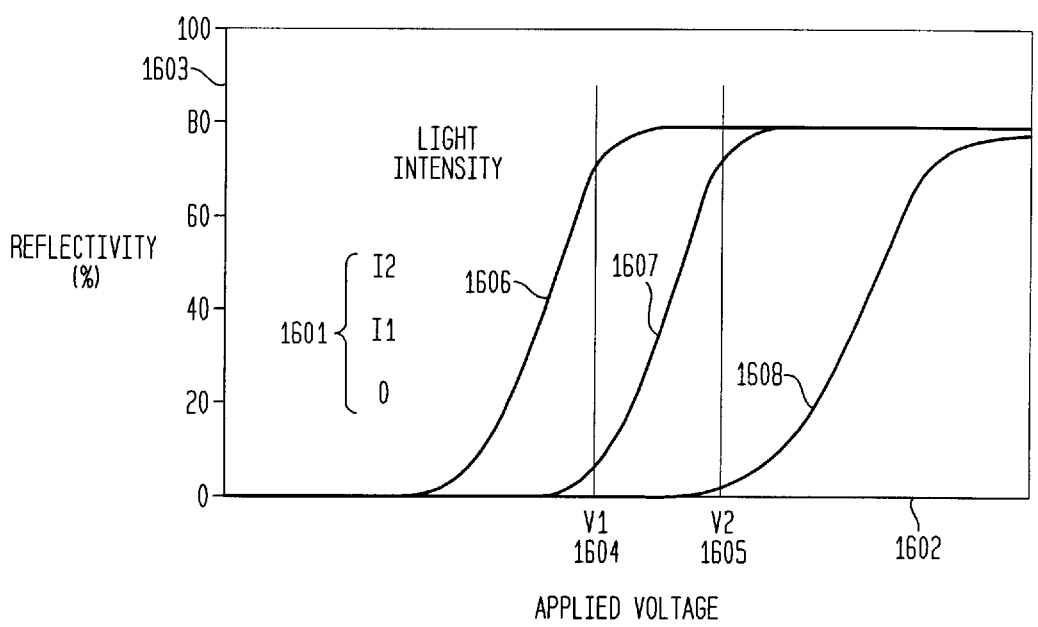
FIG. 16 is a diagram showing a driving waveform of the logic operation of the two-dimensional image.
Figure 17A:
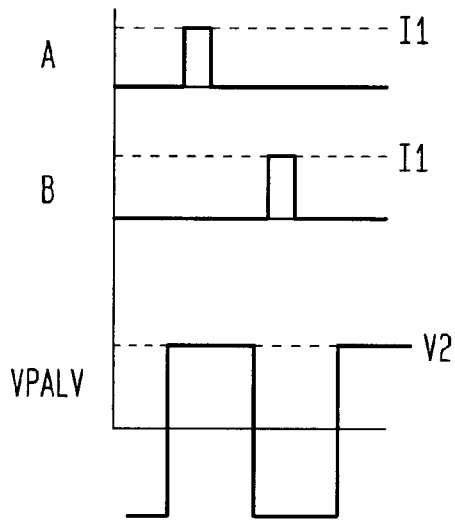
FIGS. 17(a) through 17(d) are waveform and schematic diagrams of a logic implementation of a complicated two-dimensional image on the basis of sequential operations, FIGS. 17(a) and 17(b) showing a logic "A and B", and FIGS. 17(c) and 17(d) showing an Exclusive Or (EX OR)
Figure 17B:
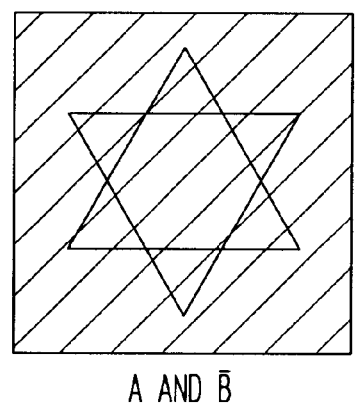
Figure 17C:
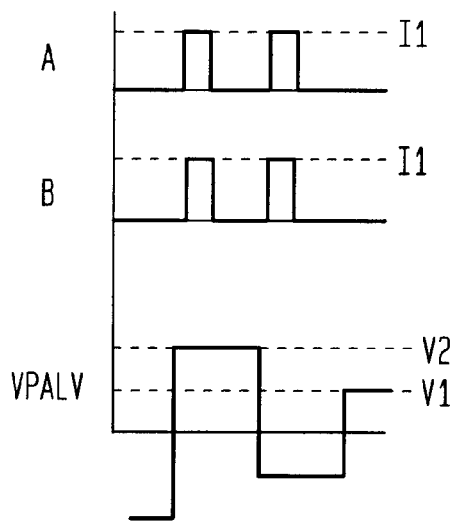
Figure 17D:
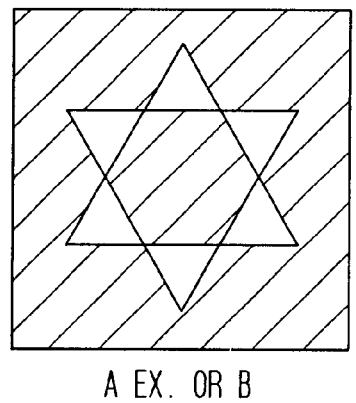

FIG. 16 shows the operational characteristics of the PALV, namely the relationship between the driving voltage and the reflectivity representing a relative output beam intensity of the PALV, wherein the input beam intensity is a parameter. $I_1$ 1607 and $I_2$ 1606 denote input beam intensities selected in this embodiment. 0 1608 indicates that the intensity is 0. Similarly, $v_1$ 1604 and $V_2$ 1605 designate the driving voltages selected. It can be understood from FIG. 16 that the PALV has a threshold characteristic with respect to the driving voltage, and the threshold thereof shifts depending on the input beam intensity. This characteristic is derived from the threshold characteristic of the electrooptic effect. These threshold characteristics are combined to create the logic operation shown in FIG. 14. Referring again to FIG. 16, when the driving voltage is set to the lower voltage side driving voltage $V_1$ 1604, the reflectivity can be controlled by the input beam intensity. This is no more than the "and" operation by which the reflectivity is allowed to transit to a higher level only in the high intensity portion where the input beams are overlapped.

Figures 15A, 15B, 15C:
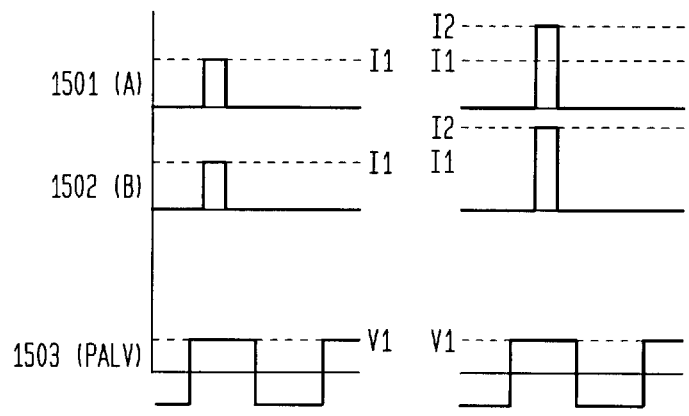
FIG. 15 is a characteristic diagram of the operation of the PALV.

FIGS. 15(*a*)–(*c*) show a driving method based on this operation. In a first case (1501A), the input beam intensity is set at the level $I_1$ 1607, wherein the input beam intensity is not allowed to singly transit (i.e. only an "and" operation can effect writing). In a second case (1502B), the input beam intensity is inputted after setting it at the higher level $I_2$ 1606 wherein the input beam intensity can singly transit. As a result, the "or" operation can be effected, wherein the region to which any one of them is inputted becomes a transitable region. As seen in 1503 of FIG. 15(*c*), when the driving voltage is set at the higher level $V_2$ 1606, the threshold of input beam intensity decreases and $I_2$ 1506 alone is transitable, whereby the same "or" operation can be executed.

The PALV is capable of storing an intricate two-dimensional image logic by sequentially performing the operations. FIG. 17 shows a simple example of the logic. FIGS. 17(*a*) and 17(*b*) show a logic of "A and $\overline{B}$". After writing an input "A" during a positive cycle, "B" is written during a negative cycle. As a result of this, a logic for performing A.$\overline{B}$ is obtained. FIGS. 17(*c*) and 17(*d*) show an example of an EXCLUSIVE-OR operation. The operation starts with writing A+B by the method shown in case 1503 of FIG. 15(*c*). Next, the method of case A (1601) of FIG. 15(*a*) is applied to the negative cycle, thereby writing "($\overline{A+B}$)". Combining (A+B)($\overline{A+B}$) gives A$\overline{B}$+$\overline{A}$B. These equations can be combined further to obtain more complicated and interesting designs.

In this embodiment, $V_{PALV}$ is modulated because the PALV driving voltage has a quicker response than would occur if the input beam is modulated. As illustrated in FIG. 15, however, the threshold characteristic is obtainable either by the varying the driving voltage or the input beam intensity. Therefore, the same result is acquired even when modulating the input beam intensity.

The negative logic of FIGS. 17(*c*) and (*d*) (eg. $\overline{A}$) is obtained simply by writing during the reversed polarity period. The negative logic can also be obtained by a method of effecting polarization rotations by a read optical system and by a rotating element (e.g., a half-wavelength plate and a twisted liquid crystal element, etc.) of polarization.

The erasing process may be executed by the method previously described in FIG. 12 or by applying a high voltage pulse of such value as to cause a transition with no input beam, which is explained in the first embodiment.

A dielectric mirror is included in the PALV. The read-out beam thus does not effect the photoconductive material, therefore it is possible to read an image recorded on the PALV at any time. This separation mirror can be eliminated. This process is useful when the read-out beam irradiation timing is not overlapped with the driving pulse, and therefore the PALV is not affected by the read-out beam during a state transition. With this arrangement, a transmission read type recording device is attainable.

In addition, the erasing beam may also be eliminated. The reason for this is that the beam for reducing an impedance of the photoconductive material during a state transition is not necessarily required. For example, in a dark state, if a pulse larger than the amplitude of the write pulse is applied, erasing will occur. In order to function in this manner, the photo-conductive material would possess a structure having a commutating property in the dark state similar to the structure of a PIN diode. The SmC* liquid crystal is put into the erasing state S1 by a forward pulse. The erasing process can be also performed by this method. The image can be written in the same manner as above. The formed image can be transcribed on the photosensitive medium.

The writing method in the second embodiment is intended to transform the spot scan image in the first embodiment into a two-dimensional image. The logic, described in this embodiment between the incident beams can be utilized with the write beam image in the first embodiment. This method is effective in a write process which utilize write beams having different diameters, in write processes in different beam scanning directions and as logic between a two-dimensional image input beam and the scanning beam. In this case, an available beam scanning method may be a raster scan or a vector scan.

Third Embodiment

A third embodiment will deal with a case where the present invention is applied to a color image forming device.

As discussed in the first two embodiments, spot or area pixels are written to the PALV, whereby the PALV is capable of forming and erasing an image at a high speed as well as effecting partial erasing/writing processes thereof. The first embodiment has already disclosed the image forming device in which the PALV is used for a secondary development. In the third embodiment, the color image forming device utilizes the image forming device of the first embodiment.

In a color image forming device, a read-out beam wavelength is restricted to output image information which differs depending on the wavelength. The image information is recorded on the photosensitive medium. The basic configuration is the same as FIG. 1. The PALV has also the same construction as in the first embodiment.

Figure 18:
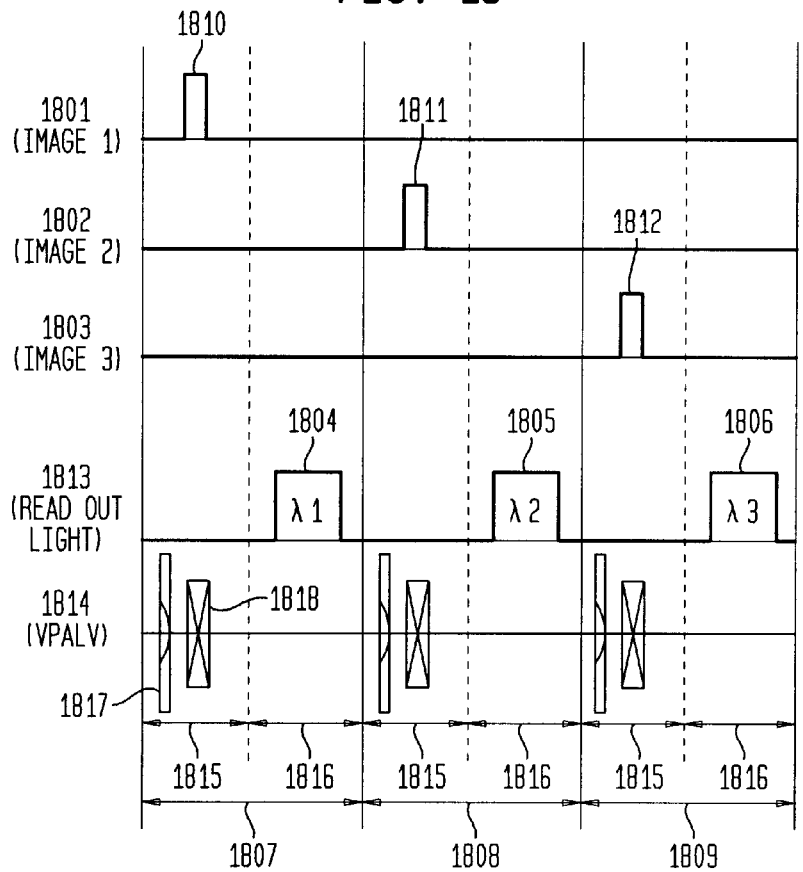
FIG. 18 is a chart showing an operating principle of a color image forming device.

FIG. 18 is a waveform diagram showing the operating principle of the color image forming device for recording three images on the photosensitive medium by using the read-out beams having three different wavelengths or wavelength regions. A series of processes consist of operating processes 1807, 1808 and 1809 correspond to the respective image. Each operating process is composed of a recording period 1815 corresponding respectively to wavelengths 1804, 1805 and 1806, and an output period 1816 of the image beam. During each the recording period 1815, as explained earlier, erasing is effected by an erasing pulse 1817. Subsequently, the image is recorded by synchronously applying a write pulse 1818 of a $V_{PALV}$ 1814 and an image input beam 1810 (or 1811 or 1812 depending on the operating process). During the respective output periods 1816, the PALV is irradiated with read-out beams 1804, 1805 and 1806 (having different wavelengths $\lambda 1$, $\lambda 2$ and $\lambda 3$) corresponding to the images 1801, 1802 and 1803. The image beams having different wavelengths fall on the photosensitive medium.

In the third embodiment, the read-out beam is created by using a halogen lamp beam travelling through a wavelength selecting filter. Three filters are changed to correspond to the color to be displayed during the respective output periods. FIG. 18 shows a case where the three images are obtained in the three recording output sequences with the three wavelengths. The number of sequences is not limited to three. For example, if the sensitivity of the photosensitive medium extends over the entire visible region, the images which differ according to red, green and blue are given to the PALV. The images are read by the method described above, and it follows that the photosensitive medium acquires full-color information.

It is preferable that the wavelength of the image beam outputted from the PALV be the same as the modulation spectrum possessed by the photosensitive medium. That is, a red PALV output beam is given for red coloring of the photosensitive medium. The reason for this is that the "real body" is illuminated with the light, and the write beam emerging from the real body can also pass through to the photosensitive medium.

When recording the images on the photosensitive medium through the PALV, however, the spectrum of the beam written to the PALV is not necessarily equalized to that of the PALV output beam. The spectrum of the image beam 1801 shown in FIG. 18 may differ from that of the corresponding read-out beam 1804. Similarly, the spectrum may be different from the coloring spectrum of the photo-sensitive medium. Those spectra can be set independently.

When recording the image directly on a photosensitive medium having a low sensitivity, this requires illumination beams of large power. Ordinary substances have diffusive characteristics of reflection. Illumination beams of large power are also needed in this configuration. In the case of employing the PALV, the image beam coming from the real body is temporarily recorded on PALV. It follows that the writing process can be effected during a relatively long period on the photosensitive medium with a small illumination light source. The PALV exhibits high sensitive photoelectric converting action with the aid of the photoconductive material. The PALV is therefore capable of writing with a beam of extremely faint light and reading the image with a beam having a high intensity. In other words, in this configuration the PALV amplifies the image beam. Besides, the PALV is able to control an electric field. Hence, the PALV can also function to control the foregoing inter-image and the fluctuations in the write beam quantity as well.

Note that the erasing beam is not illustrated in FIG. 18. That is because the light for reducing the impedance of the photo-conductive material is not necessarily needed during the state transition. In FIG. 18, a pulse larger than the write pulse amplitude is given in the dark state, and erasing is carried out. In such a case photoconductive material has a structure such as a PIN structure having a commutating property in the dark state. This may be attained by a method of bringing the SmC* liquid crystal in the erasing state $S_1$ with a forward pulse.

The image beams may be inputted to the PALV by the beam scanning methods shown in the first embodiment or the two-dimensional image input shown in the second embodiment. An inputting method utilizing a combination thereof may also be implemented.

Fourth Embodiment

The first embodiment has shown that the PALV is capable of forming and erasing the image at the high velocity as well as effecting the partial erasing/writing processes by sequentially writing the spot or area pixels. The fourth embodiment will present an example of an image forming device incorporating complex functions including a display function, a printer function and a copying machine function.

Figure 19:
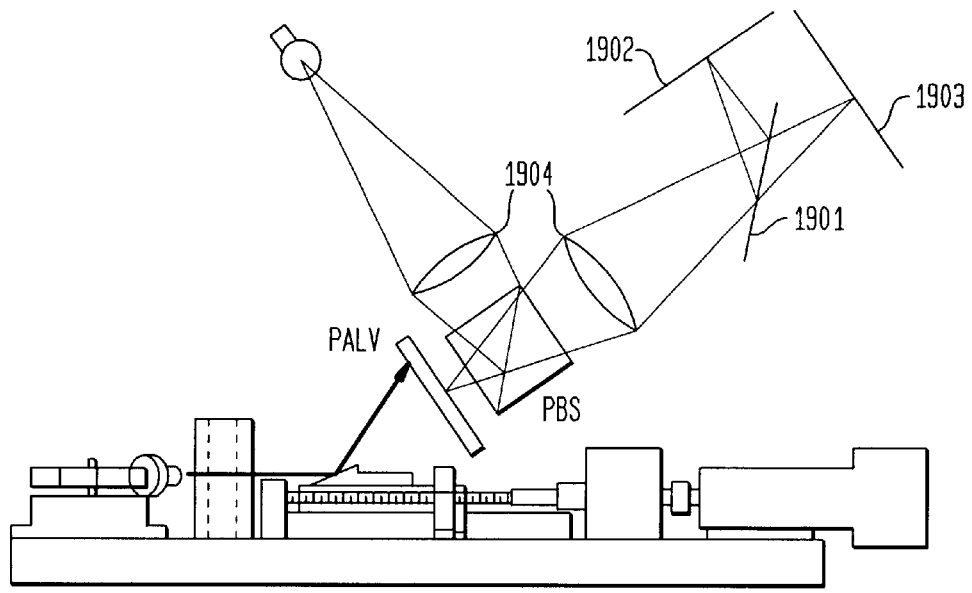
FIG. 19 is a waveform diagram of a color image forming device for recording three images in accordance with the invention.

FIG. 19 shows an example of a complex machine constructed of a display and a printer. A method of inputting the image to the PALV is the same with the embodiment 1. Therefore, only an image read-out unit will be explained. A half-mirror 1901 defined as a read-out beam distributing means is interposed between projection lenses 1904 and a screen 1903. The PALV image beam detected by a polarization beam splitter (PBS) is split into two sub-beams by half-mirror 1901. One sub-beam of the image beam is projected on a screen 1903 for display, while the other sub-beam is projected on a photosensitive medium 1902 for a page printer. The image can thereby be printed simultaneously when displaying the image information. In the fourth embodiment, the half-mirror is disposed on the read-out beam side. There is, however, a method of writing the image directly on sensitizing paper with the distributed write. beams by providing the half-mirror on the write beam side. An additional method is that time sharing is executed to distribute the image beams to the display and the printer.

Added to the write system of the PALV is an optical system of the copying machine, i.e., the image inputting optical system shown in the second embodiment. With this arrangement, the single machine is capable of compactly incorporating three functions, a page display function, a color page printer and a color copying machine.

The embodiments have been described so far, and the present invention can be conceived as an electronic film electrically controllable by the driving electric field. Hence, this invention is, as a space modulation element, widely applicable not only to the embodiments discussed above but also to electronic image devices, image display systems, image registers and optical arithmetic units.

As described above, the present invention exhibits the following advantages. An electronically controlled two-dimensional image can be formed. The recording functions thereof can be obtained. Furthermore, this invention can be utilized as both reflection type image inputting means and transmission type image inputting means. Both can be utilized irrespective of the two-dimensional input and the scanning input.

The image formed is read out to the photosensitive medium. This yields an advantage in which the image can be recorded on the photosensitive medium at a high speed. An additional advantage is that the inter-image process is executed, and its result can be outputted.

A width of selecting the sensitivity of the photo-sensitive medium and the photosensitive wavelength characteristic is increased owing to the amplifying action of the PALV and the wavelength converting characteristic. The optimization thereof can thus be attained. The highly accurate beam depiction serves to expand a degree of freedom of selecting the light beam source when forming the image on the PALV. It is possible to provide the small-sized image forming device having a high reliability and a high efficiency.

An oblique vapor deposition film is employed as a liquid crystal orientation film, thereby improving the contrast and the brightness as well.

The PALV can be driven by an AC waveform during the write period. In this way, deterioration of the liquid crystal serving as an electrooptic medium is minimized, thus obtaining high reliability. Recording is performed by using the positive and negative polarities during the recording period. As a result, the necessity for the erasing period is eliminated, and the recording electric field can be transformed into an AC field. The drive for making partial rewriting possible becomes practicable because of the partial erasing/recording process.

Furthermore, the logic between the input beams can be taken, and hence the image can be functionally processed. The basic logic element in the parallel image process can be provided.

As explained above, it is feasible to provide the light-valve-based compact image forming device which, as a single unit, incorporates the functions of the page display, color page printer and full-color copying machine.

A one-dimensional optical scanning device typified by the polygon-mirror scanning device can be put into practice. Besides, the two-dimensional optical scanning device can be also put in operation simply by adding the linear movable mirror to the correction optical system and the condensing optical system without changing an image forming status. There is no reason to add a complicated anamorphic lens and a focal point correcting mechanist. Therefore, it is possible to provide the two-dimensional optical scanning device and the image forming device at lower costs.

According to the present invention, the high-speed two-dimensional optical scanning device exhibiting a high accuracy and a complete synchronous relationship can thus be actualized.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction, wherein said first deflector means includes a rotating polygon mirror for deflecting said at least one scanned light beam and wherein said second deflector means includes a mirror linearly and incrementally movable along a first path for deflecting the at least one scanned light beam deflected by said first deflector means so that a second path of the deflected at least one scanned light beam from said first deflector extends essentially orthogonally to said first path and is incrementally displaced along the second path after said at least one scanned light beam has been scanned a predetermined distance along said second path;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

2. The image forming device of claim 1, wherein an effective scanning length $1p$ on said scanning plane, a distance traveled by said linearly movable mirror $1s$, an angle $\alpha/2$ made by said linear movable mirror and a plane along which said linearly movable mirror moves, and an angle $\beta$, made by a scanned plane of said light valve means and the plane including the second path of said linearly movable mirror is expressed by the equations:

$1p/\sin\alpha - 1s/\sin\beta$ $\alpha + 2\beta = \pi$

3. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction;

a first detecting means for detecting a scanning cycle of said first deflector means and producing a first reference signal, said second deflecting means incrementally deflecting said at least one scanned light beam deflected by said first deflecting means an incremental distance in response to said reference signal;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium;

including a first detecting means for detecting a scanning cycle of said first deflector means and producing a first reference signal, said second deflecting means incrementally deflecting said at least one scanned light beam deflected by said first deflecting means an incremental distance in response to said reference signal; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

4. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction;

an image signal source means which provides a horizontal synchronization signal as a reference signal, said at least one scanned light beam producing means synchronizing with said reference signal;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

5. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction;

an image signal source means which provides a horizontal synchronous signal as a reference signal, said at least one scanned light beam producing means and said electric field applying means synchronizing with said reference signal;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

6. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium, wherein said electric field applying means produces an AC signal driving voltage for application to said light valve means including a first write driving signal which assumes a polarity which synchronizes with a positive image input by said image inputting means and a second write driving signal which assumes the opposite polarity which synchronizes with a negative image input of said image inputting means;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

7. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction, wherein said image inputting means produces at least one scanned light beam having a first intensity level at which said electrooptic medium is transited from one state to another by inputting at least one scanned light beam of said first intensity and a second intensity level at which said electrooptic medium is not transited from one state to another by inputting said at least one scanned light of said second intensity but is transited by inputting simultaneously at least two scanned light beams each of said second intensity level;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

8. An image forming device, comprising:

means for providing a light valve including at least one layer of a photoconductive material rendered conductive by light of at least a predetermined intensity level and at least one layer of an electrooptic medium having at least a predetermined electric field threshold, said light valve means having an image forming region which is defined by at least portions of said layers of photoconductive material and electrooptic medium which are in registration, said image forming region of said light valve means being free of an electrically conductive layer between said layers of photoconductive material and electrooptic medium;

means for applying a modulated electric field across said layers of photoconductive material and electrooptical medium of said image forming region of said light valve means and modulating said electric field relative to said predetermined electric field threshold of said electrooptic medium;

means for producing at least one scanned light beam;

means for inputting an image to said photoconductive material by modulating and scanning said at least one scanned light beam along the photoconductive layer side of said image forming region of said light valve means synchronous with the modulation of said electric field, said image inputting means including a first deflector means for deflecting scanning of said at least one scanned light beam in a first direction and second deflector means for deflecting scanning of said at least one scanned light beam deflected by said first deflector device in a direction essentially orthogonal to said first direction, wherein said image inputting means produces at least two scanned light beams each having a predetermined intensity; and said electric field means produces a driving voltage for application to said light valve means having a first voltage level at which said electrooptic medium is transited from one state to another by inputting said at least one scanned light beam of said first predetermined intensity and a second voltage level at which said electrooptic medium is not transited from one state to another by inputting only one of said at least two scanned light beams of said predetermined intensity but is transited by inputting at least two scanned light beams each of said predetermined intensity;

a location of said photoconductive material becoming conductive to permit application of said electric field to a corresponding location of said electrooptic medium at least when said at least one scanned light beam is modulated to have an intensity above said predetermined level is applied to said location, a corresponding location of said electrooptic medium in registration with said photoconductive material which has become conductive undergoing a light transmissive state transition upon application of said electric field modulated to be at least at said predetermined threshold, whereby said image input by said image inputting means is stored in said electrooptic medium; and means for reading said stored image from said light valve means, wherein said image is written into said electrooptic medium at successive locations in said light valve means where said predetermined threshold of the electric field and said predetermined intensity level of the at least one scanned light beam are simultaneously satisfied, for reading by said image reading means.

9. A two dimensional optical scanning device comprising means for generating at least one scanned light beam, a rotating polygon mirror deflector for scanning of the at least one scanned light beam in one direction, a focusing optical means for directing the at least one scanned light beam on a scanning plane to form an image; a linear movable mirror linearly movable along a specified plane for reflecting said at least one scanned light beam deflected by said rotating polygon-mirror deflector at a given angle; and a linear mirror mover for moving said linearly moveable mirror in a linear direction along a specified plane, wherein an effective scanning length 1p on the scanning plane, a distance traveled by said linear movable mirror is, an angle α/2 made by said linear movable mirror and the specified plane and an angle β made by the scanned plane and the specified plane is expressed by the equations:

$$1p/\sin\alpha = 1s/\sin\beta$$

$$\alpha + 2\beta = \pi$$

where π is a constant.

10. The two-dimensional optical scanning device of claim 9, wherein said polygon mirror deflector includes a rotating polygonal member having a plurality of side faces intercepting said at least one scanned light beam and at least one mirror in each of said side faces, said focusing optical means including an optical lens system for focusing a degree of parallelism of a rotary axis with each mirror of said polygon mirror deflector.

11. An image forming device, comprising:

means for providing a light valve including at least one layer of a photoconductive material defining a two-dimensional surface and rendered conductive by light at least of a predetermined intensity level and at least one layer of an electrooptic medium having at least a predetermined electric field threshold, said light value means having an image forming region which is defined by at least portions of said layers of photoconductive material and electrooptic medium which are in registration, said image forming region of said light valve means being free of an electrically conductive layer between said layers of photoconductive material and electrooptic medium;

means for applying an electric field modulated relative to said threshold across said layers of photoconductive material and electrooptical medium of said image forming region of said light valve means;

means for producing at least two light beams;

means for inputting at least one two-dimensional optical image to said photoconductive material by modulating the intensity level of said at least two light beams synchronous with said modulation of said electric field and including means for scanning said at least two light beams along said image forming region of said two-dimensional surface synchronous with said modulation of said light intensity level and said modulation of said electric field;

a location of said photoconductive material becoming conductive to permit application of said electric field to a corresponding location of said electrooptic medium in registration with said photoconductive material which has become conductive at least when light from at least one of said at least two scanned light beams of said at least predetermined intensity level is applied to said location, a corresponding location of said electrooptic medium undergoing a light transmissive state transition upon application of said electric field modulated to be at least at said predetermined threshold, whereby said image input by said image inputting means is stored in said electrooptic medium; and means for reading said stored two-dimensional image from said light valve means, wherein said two-dimensional image is written into said electrooptic medium at successive locations in said light valve means dependent on a coincidence of light at at least said predetermined intensity level applied at said locations and said electric field of at least said predetermined threshold being applied to said light valve means, for reading by said image reading means.

12. The image forming device of claim 11 wherein said at least two-dimensional image is written into said electrooptic medium at locations in said light valve means determined by a coincidence of the predetermined threshold of the electric field and the predetermined intensity level of the at least two scanned light beams.

13. The image forming device of claim 11, wherein said scanning means includes a first deflector means for deflecting said at least two scanned light beams in a first direction and second deflector means for deflecting said at least two scanned light beams deflected by said first deflector means in a direction essentially orthogonal to said first direction.

14. The image forming device of claim 13, wherein said first deflector means repetitively deflects said at least two light beams from a predetermined starting position for a predetermined distance in said first direction.

15. The image forming device of claim 14, wherein said second deflector means incrementally deflects said at least two light beams at each termination of the scanning by said first deflector device for said predetermined distance.

16. The image forming device of claim 11, said electric field means applying an AC voltage to said light valve means, said image inputting means inputting at least two two-dimensional optical images, one said image in synchronization with a positive period of said AC voltage and another of said images in synchronization with a negative period of said recording means.

17. The image forming device of claim 11, wherein said image inputting means projects at least two two-dimensional optical images in synchronization with said electric field means and said image reading means.

18. The image forming device of claim 11, wherein said image inputting means inputs at least two two-dimensional optical images in synchronization with said electric field means according to time series.

19. The image forming device of claim 11, wherein said image inputting means produces at least one scanned light beam having q first intensity level at which said electrooptic medium is transited from one state to another by inputting said at least one scanned light beam of said first intensity and a second intensity level at which said electrooptic medium is not transited from one state to another by inputting said at least one scanned light beam of said second intensity but is transited by inputting simultaneously at least two scanned light beams each of said second intensity level.

20. The image forming device of claim 11, wherein said image inputting means produces at least two scanned light beams each having a predetermined intensity; and the electric field means produces a driving voltage for application to said light valve means having a first voltage level at which said electrooptic medium is transited from one state to another by inputting said at least one scanned light beam of said first predetermined intensity and a second voltage level at which said electrooptic medium is not transited from one state to another by inputting only one of said at least two scanned light beams of said predetermined intensity but is transited by inputting at least two scanned input light beams each of said predetermined intensity.

21. The image forming device of claim 11, wherein said electrooptic medium exhibits a bistability for storing said image.

22. The image forming device of claim 21, wherein said electrooptic medium is a ferroelectric liquid crystal, said light valve means including a surface in contact with the ferroelectric liquid crystal and an oblique vapor deposition film composed of an inorganic oxide on said surface.

23. The image forming device of claim 11, wherein said image reading means includes means for applying a reading light on said electrooptic medium and light valve means includes means for reflecting said reading light positioned intermediate said photoconductive material and said electrooptic medium.

24. The image forming device of claim 11, wherein said image reading means includes means for irradiating said electrooptic material with at least two read-out beams having plural and different wavelength regions.

25. The image forming device of claim 11, said image reading means includes means for irradiating said electrooptic material with light of a spectrum different from a spectrum of the light of said image inputting means.

* * * * *